UNITED STATES PATENT OFFICE.

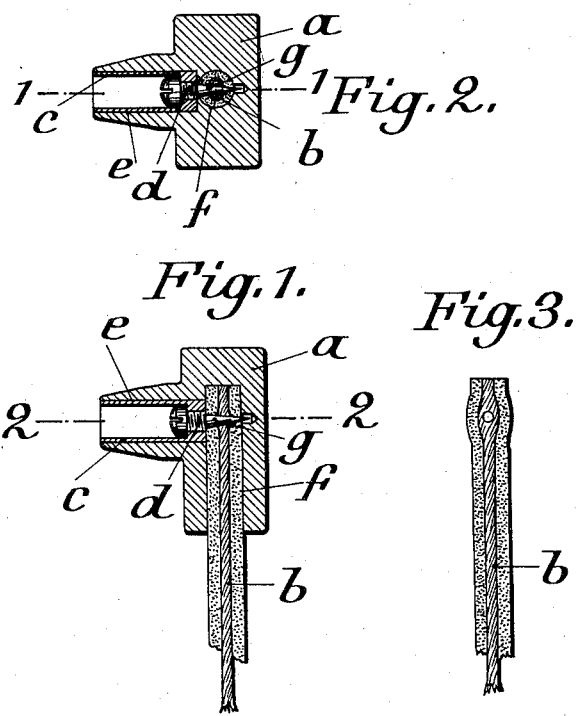

GOTTLOB HONOLD, OF STUTTGART, GERMANY, ASSIGNOR TO THE FIRM OF ROBERT BOSCH, OF STUTTGART, GERMANY.

BINDING-POST FOR CONNECTING ELECTRIC CABLES.

1,030,817.
Specification of Letters Patent. Patented June 25, 1912.
Application filed February 14, 1912. Serial No. 677,596.

*To all whom it may concern:*

Be it known that I, GOTTLOB HONOLD, a subject of the German Emperor, residing at 11–13 Hoppenlaustrasse, Stuttgart, Germany, have invented certain new and useful Improvements in Binding-Posts for Connecting Electric Cables; and I do hereby declare the following to be a full, clear, and exact description of the invention, such as will enable others skilled in the art to which it appertains to make and use the same.

My invention refers to binding posts for connecting electric cables, more especially for making up the connections required in electric installations used for the ignition of explosion motors.

The object of this invention is to supply a binding post, which not only constitutes a firm and reliable connection, but will at the same time provide an absolutely water-tight protection to the end of the cable and the metallic parts to which it is to be connected, as for instance, a metallic sleeve adapted to receive a connecting plug.

The invention consists in providing a block of insulating material having two borings disposed at right angles to each other, one of which is adapted to receive the end of the cable and the other to contain a metallic connecting piece such as a sleeve for the reception of a plug or any other metallic part to which the end of the cable is to be conductively connected, and of threading a pointed screw through the bottom of such sleeve or other part, which will allow of being thrust through the end of the cable thereby distending it and causing the insulating covering to completely fill the boring containing the cable and thus effectually preventing the introduction of water or damp air.

In the drawing Figure 1 is a sectional elevation of my improved binding post on line 1—1 of Fig. 2 and Fig. 2 a cross section on line 2—2 in Fig. 1. Fig. 3 is a longitudinal section through the end of the cable showing the distention of the end.

In Figs. 1 and 2 $a$ is a block of insulating material such as vulcanite having two borings $e$ and $f$, disposed at right angles to each other. Into the boring $e$ a metallic sleeve $c$ fits tightly and into the bottom of this sleeve a screw $d$ is threaded having a conical prolongation or point $g$. The boring $f$ is fitted to the cable that is to be employed in such a manner that the end of the cable can be easily introduced into the boring.

To connect a cable $b$ with the metallic sleeve $c$ its end is introduced into boring $f$, and the screw $d$ is tightened. Point $g$ then pierces the end of cable and thereby produces a firm and reliable conductive connection between the cable and the sleeve $c$ and at the same time distends the end of the cable so as to completely fill and effectually close the boring $f$. In order to insure water tightness of the joint between the cable and the binding post, I prefer to use a cable having an insulating covering of soft rubber. But the invention can be applied to any other cable of usual manufacture with almost equal success.

Having now particularly described and ascertained the nature of my said invention and in what manner the same is to be performed, I declare that what I claim is:—

The herein described binding post for connecting the end of an electric cable consisting of the combination with a block of insulating material having two borings disposed at right angles to each other of a metallic connecting piece fitted tightly into one of the said borings and a pointed screw threaded into the bottom of said connecting piece and adapted to pierce and thereby distend the end of a cable introduced into the other boring.

In testimony whereof I affix my signature, in presence of two witnesses.

GOTTLOB HONOLD.

Witnesses:
MAX ANSCHUTZ,
PAUL WOLFART.